Figure 4:
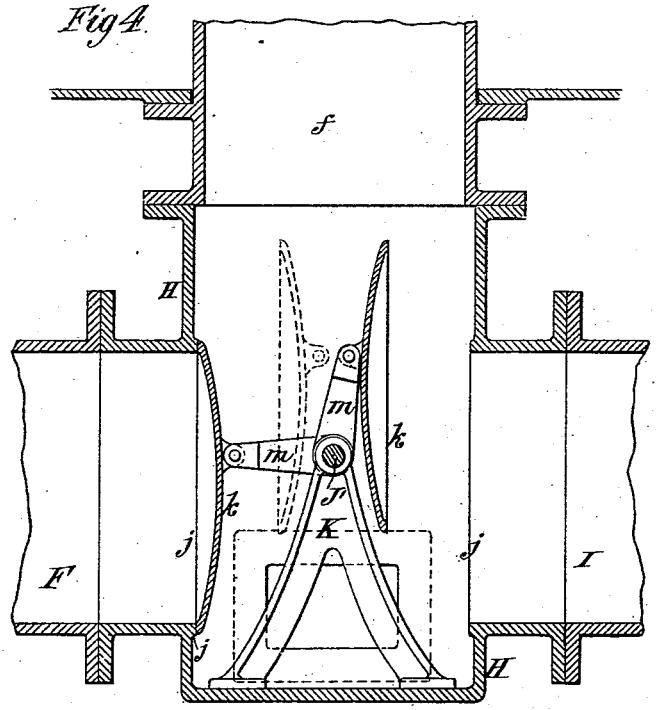

(No Model.)
3 Sheets—Sheet 1.
C. W. ISBELL.
GAS PURIFYING BOX.
No. 291,190.   Patented Jan. 1, 1884.
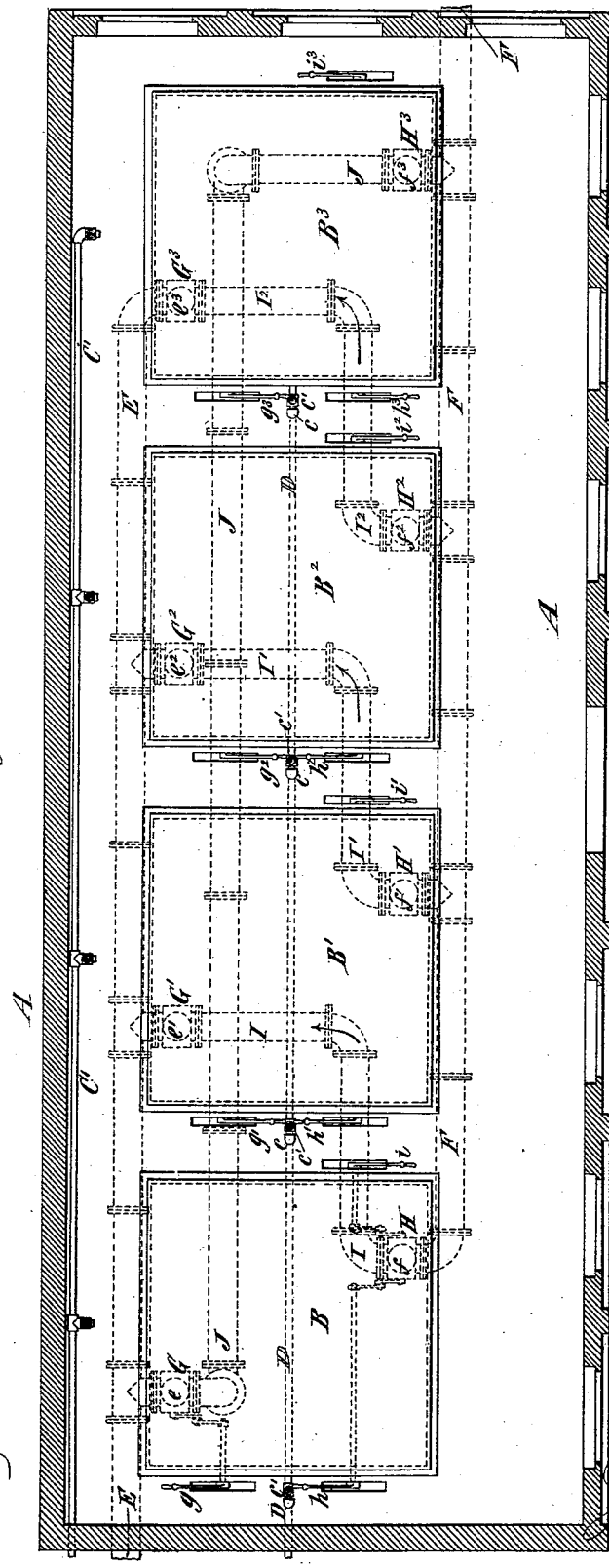
Witnesses:
Inventor:

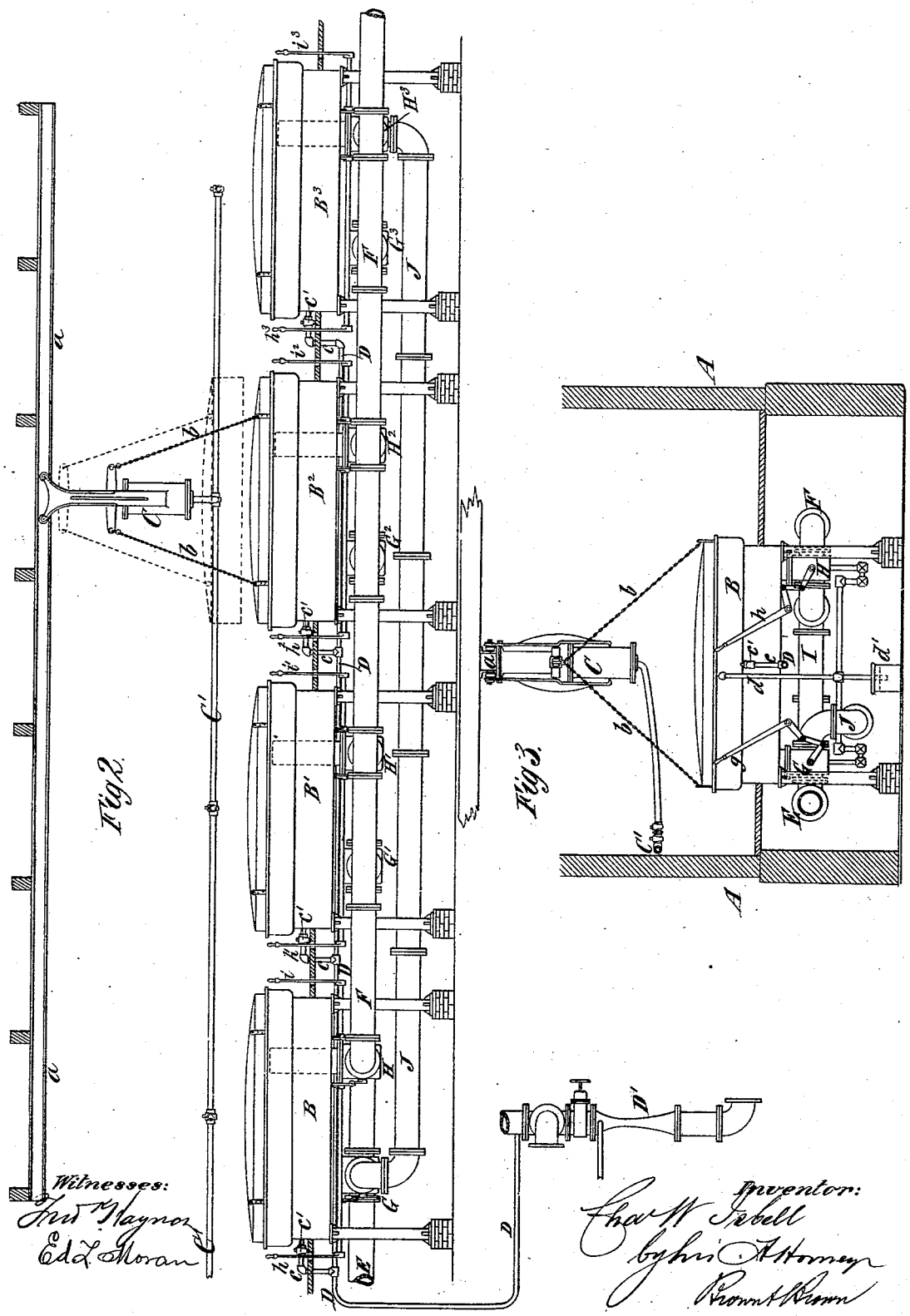

(No Model.) 3 Sheets—Sheet 3.
C. W. ISBELL.
GAS PURIFYING BOX.

No. 291,190. Patented Jan. 1, 1884.

Witnesses:
Inventor:

United States Patent Office.

CHARLES W. ISBELL, OF NEW YORK, N. Y.

GAS-PURIFYING BOX.

SPECIFICATION forming part of Letters Patent No. 291,190, dated January 1, 1884.

Application filed March 17, 1883. (No model.)

*To all whom it may concern:*

Be it known that I, CHARLES W. ISBELL, of the city of New York, in the county and State of New York, have invented a new and useful Improvement in Gas-Purifying Boxes, of which the following is a specification.

In the purifying of gas by lime, the lime is contained in purifying-boxes, through which the gas passes, and after being used for a certain length of time these boxes have to be cleaned out and the lime removed. Ordinarily the boxes are arranged in groups of four, three only of which are usually employed at a time, one being closed out of the system for cleaning; and the most common way to control the passage of gas to and from the boxes is by a wet or dry center seal, by means of which gas may be shut off entirely from only one of the boxes when it is desired to clean it, and passed successively through the other three. In changing or adjusting the center seal to cut out a purifying-box when it is desired to clean it, more or less unpurified gas is liable to blow through and become mixed with the purified gas, and if a dry seal is used there is apt to be a constant leakage of unpurified gas into the purified gas, or an outward leakage and waste of gas. With the usual center seal only three of the four boxes can ever be used. Ordinarily when a purifying-box is to be cleaned its cover is lifted off, and all the gas in the box is allowed to escape into the air, thereby wasting gas and contaminating the air of the building.

The principal objects of my invention are to dispense with the center seal, and thereby prevent the leakage of gas and the admixture of the purified and unpurified gas, and to enable three, four, or any number of purifying-boxes to be used, and to prevent the gas contained in any one box from escaping into the atmosphere when the box is to be cleaned.

The invention therefore consists in the combination, with a number or series of purifying-boxes, of a novel system of pipes and valves, hereinafter particularly described, whereby the desired results are attained.

The invention also consists in the combination, with a number or series of purifying-boxes, of a pipe connected with them and the exhauster of the retorts whence the gas is obtained, whereby provision is afforded for withdrawing all the gas from any one box when it is desired to clean it, and returning it, to be again passed through the purifying-boxes.

The invention also consists in a valve of novel construction for use in connecting the boxes with their inlet and outlet pipes, and with each other, as hereinafter described.

Figure 5:
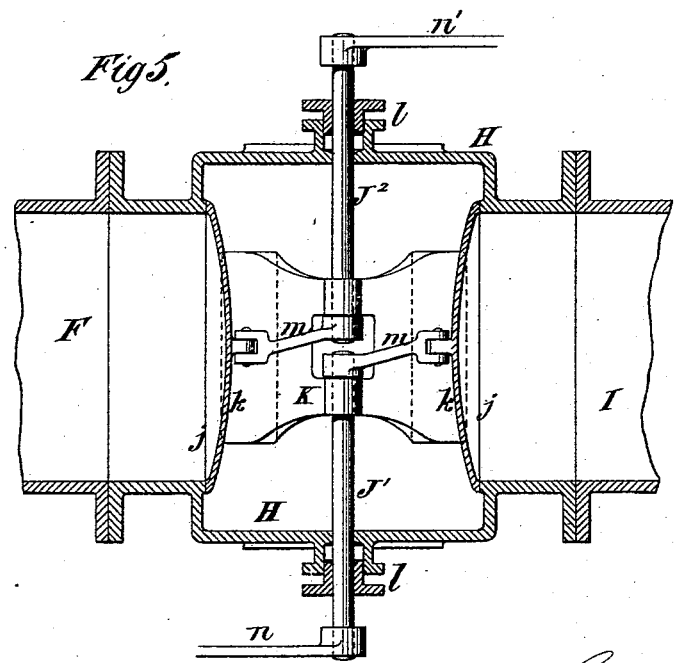

In the accompanying drawings, Figure 1 is a plan of a number of purifying-boxes arranged and connected according to my invention. Fig. 2 is a side elevation thereof. Fig. 3 is an end elevation thereof. Fig. 4 is a vertical section, on a larger scale, of a double valve which I prefer to employ; and Fig. 5 is a horizontal section of such valve.

Similar letters of reference designate corresponding parts in all the figures.

A designates the purifying-house, wherein are placed purifying-boxes, here shown as four in number, B B' B² B³. In themselves these boxes are or may be similar to others now in use.

In order to remove the covers for cleaning any of the boxes, I may employ a hydraulic lifting apparatus, C, which is movable along a track, *a*, and may be connected by chains *b* with any cover.

C' designates a main supply-pipe for supplying the lifting apparatus, and which is provided with connections opposite the several boxes, so that a motive agent can be readily supplied for lifting the cover of any of the boxes.

D designates a pipe extending below the boxes, and having each box connected with it by a leg or branch pipe *c*, in which is a cock or valve, *c'*. The pipe D leads to the exhauster D', which is shown in Fig. 2 only, and which is the steam-jet exhauster employed to exhaust the gas from the retorts and pass it through the scrubber. The arrangement of the exhauster would be the same as usual, and not as shown in Fig. 2. When it is desired to remove the gas from any one box, the box is cut out of the system, the cock *c'*, which connects said box and the main pipe D, is opened, and the gas in the box is drawn off by the exhauster and again sent through the scrubber and purifier-boxes. Each box is supplied with a drip-pipe, $d$, for tar, (shown in Fig. 3,) and the tar is collected in a receptacle, $d'$.

E designates the main inlet-pipe, which extends along the series of boxes, and F designates an outlet-pipe through which the purified gas is delivered. The inlet-openings $e\ e'\ e^2\ e^3$ and the outlet-openings $f\ f'\ f^2\ f^3$ of the several boxes are shown dotted in Fig. 1. The inlet-openings $e\ e'\ e^2\ e^3$ are controlled by single valves, of which $G\ G'\ G^2\ G^3$ designate the casings, and the outlet-openings $f\ f'\ f^2\ f^3$ are controlled by double valves, of which $H\ H'\ H^2\ H^3$ designate the casings. The valve-casings $G'\ H$ are connected by a pipe, I, the valve-casings $G^2\ H'$ are connected by a pipe, $I'$, and the valve-casings $G^3\ H^2$ are connected by a pipe, $I^2$, and all the pipes $I\ I'\ I^2$ extend from the pipe E to the pipe F. The valve-casings $G\ H^3$ are connected by a pipe, J. The several single valves in the casings $G\ G'\ G^2\ G^3$ are all operated by means of handles $g\ g'\ g^2\ g^3$, and devices shown in Fig. 3, connected with arms on the rock-shafts of the valves. The several double valves in the casings $H\ H'\ H^2\ H^3$ are operated by handles $h\ h'\ h^2\ h^3$ and $i\ i'\ i^2\ i^3$ connected with the valves in a similar manner. The several valves employed may be of any suitable construction; but I prefer to or may use valves of the construction shown in Figs. 4 and 5, which I will now describe, and which represent a double valve. The valve-casing H is connected on one side to the pipe I and on the other side to the outlet-pipe F, and $j$ designates the valve-seats, on which are seated disk-valves $k$.

$J'\ J^2$ designate two rock-shafts, or a divided rock-shaft, the two parts of which are in line, and which project through stuffing-boxes $l$ in opposite walls of the valve-casing. The rock-shafts are journaled in a standard, K, and are provided inside the casing with arms $m$, to which the disk-valves $k$ are pivoted. The rock-shafts $J'\ J^2$ are provided outside the valve-casing with arms $n\ n'$, and by rotating one or the other of the shafts $J'\ J^2$ the valve attached to it will be raised or lowered relatively to its seat $j$. The arms $m$ are each of such length that they will come almost to a horizontal position when the valve is closed, as shown in Fig. 4, and the arms are pivoted to the valves above their centers, so that they will always depend downward and in an approximately vertical position. As the valves are moved downward in closing, they will, as the arms $m$ approach horizontal positions, have a sliding motion over their seats, and will therefore scrape the seats clean and remove any dirt which would otherwise hold the valve from its seat and cause leakage. The several valve-casings $H\ H'\ H^2\ H^3$ all contain double valves $k$, of the kind shown in Figs. 4 and 5, and in each of the valve-casings $G\ G'\ G^2\ G^3$ is only one valve $k$ and a single rock-shaft. When the valve in any one of the casings $G\ G'\ G^2\ G^3$ is open, gas can pass from the inlet-pipe E through the inlet-opening $e,\ e',\ e^2$, or $e^3$ to the box with which the valve is connected, and by means of the double valves gas can be prevented from escaping from any of the boxes, or it can be allowed to pass through the outlet-openings $f\ f'\ f^2\ f^3$, either through the pipes $I\ I'\ I^2$ to the next box in succession or to the outlet-pipe F. It will be understood that the gas can pass through the pipes $I\ I'\ I^2$ in the direction of the arrows only.

By the arrangement of pipes and valves above described, I am enabled to pass the gas through all four of the purifying-boxes, or through three of them, cutting out the fourth from the system, so that it may be cleaned.

As represented in Fig. 1, the valves are all adjusted so as to pass the gas through all four of the boxes. When thus adjusted, the gas passes from the inlet-pipe E through the inlet-opening $e$ into the box B; but the inlets $e'\ e^2\ e^3$ to the other boxes are all closed. The gas circulates through the box B, and passes out at the opening $f$. Communication between the opening $f$ and outlet-pipe F is closed, and all the gas passes through the pipe I to the inlet-opening $e'$ of the box B', thence through the outlet-opening $f'$ and pipe $I'$ to the inlet-opening $e^2$ of the box $B^2$, thence through the outlet-opening $f^2$ and pipe $I^2$ to the inlet-opening $e^3$ of the box $B^3$. Communication between the outlet-opening $f^3$ of the box $B^3$ and the pipe J is closed, and the gas passes from the outlet-opening $f^3$ to the outlet-pipe F. If the last box, $B^3$, of the series were being cleaned, the valves would be adjusted so as to close the communication between the outlet-opening $f^2$ of the box $B^2$ and the pipe $I^2$, and open the communication between said outlet-opening $f^2$ and the pipe F. The gas would then pass from the box $B^2$ directly into the outlet-pipe F. If the first box, B, were being cleaned, the inlet-opening $e'$ of the box B' would be the only one which would be in communication with the inlet-pipe E, and gas would pass first to the box B', and thence through pipes $I'\ I^2$ and boxes $B^2\ B^3$ to the outlet-pipe F. If the box B' were to be cleaned, the inlet-opening $e^2$ of the box $B^2$ would be placed in communication with the pipe E, and gas would pass first into the box $B^2$, thence through the pipe $I^2$ to the box $B^3$, thence through the pipe J to the inlet-opening $e$ of the box B, and thence through said box and its outlet-opening $f$ to the pipe F. If the box $B^2$ were to be cleaned, the inlet-opening $e^3$ of the box $B^3$ would be placed in communication with the pipe E, and the gas would pass first through the box $B^3$, thence through the pipe J to the box B, thence through the pipe I to the box B', and from the outlet $f'$ of the box B' to the outlet-pipe F. When any box is to be cleaned—as, for example, the box B'—I close the single valve in the casing G' and both valves in the casing H', and the box is thereby isolated or cut out from the system.

It will be seen that by my invention I prevent any admixture of the unpurified and purified gas, and that I also prevent any waste of gas, and any material contamination of the atmosphere when the cover of any box is removed.

If desired, I may employ any number of boxes, greater or less than four, arranging and connecting them as herein shown.

What I claim as my invention, and desire to secure by Letters Patent, is—

1. The combination of a number of purifying-boxes, B B' B² B³, having inlets $e\ e'\ e^2\ e^3$ and outlets $f\ f'\ f^2\ f^3$, the inlet-pipe E, the valve-casings G G' G² G³, each containing a single valve, the outlet-pipe F, the valve-casings H H' H² H³, each containing two valves, the pipes I I' I², and the pipe J, all arranged and adapted for operation substantially as described.

2. The combination, with a number of purifying-boxes, B B' B² B³, the inlet and outlet pipes E F, the connecting-pipes I I' I² J, and the valves controlling the passage of gas through said pipes to and from said boxes, of the valve-operating levers projecting upward above the floor of the purifying-house, and arranged between the boxes and on the outer sides of the two end boxes, all constructed and adapted for operation substantially as described.

3. The combination, with a number or series of purifying-boxes, of a pipe having separate communications with said boxes, and also communicating with the exhauster of the retort whence the gas to be purified is obtained, whereby provision is afforded for exhausting the gas from any one box before its cover is removed, and for returning the gas so exhausted to be again passed through the purifying boxes, substantially as described.

4. The combination, with a valve-casing, H, containing a seat, $j$, of a disk-valve, $k$, a rock-shaft, J', and an arm, $m$, pivoted to the valve, so that the valve will hang vertically or nearly vertically therefrom, all organized so that as the said arm approaches a horizontal position the valve will be caused to scrape or clean its seat, substantially as described.

5. The combination, with the valve-casing H, having oppositely-arranged seats $j$, of the disk-valves $k$, the divided rock-shaft J' J², and arms $m$, to which the valves are pivoted, all arranged and adapted to operate substantially as described, and for the purpose set forth.

CHAS. W. ISBELL.

Witnesses:
FREDK. HAYNES,
A. L. BROWN.